(12) United States Patent
Jennings et al.

(10) Patent No.: US 8,691,731 B2
(45) Date of Patent: Apr. 8, 2014

(54) HEAT GENERATION PROCESS FOR TREATING OILFIELD DEPOSITS

(75) Inventors: David W. Jennings, Houston, TX (US); Samuel Asomaning, Sugar Land, TX (US); Michael E. Newberry, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 564 days.

(21) Appl. No.: 12/940,691

(22) Filed: Nov. 5, 2010

(65) Prior Publication Data

US 2011/0114323 A1 May 19, 2011

Related U.S. Application Data

(60) Provisional application No. 61/262,191, filed on Nov. 18, 2009.

(51) Int. Cl.
*E21B 21/00* (2006.01)
*B08B 9/00* (2006.01)

(52) U.S. Cl.
USPC ............................ 507/90; 134/22.14; 166/311

(58) Field of Classification Search
USPC ........................................ 166/311; 134/22.14
See application file for complete search history.

(56) References Cited

U.S. PATENT DOCUMENTS

| | | | |
|---|---|---|---|
| 1,608,869 A | 11/1926 | Tilton | |
| 2,218,306 A | 10/1940 | Austerman | |
| 2,672,201 A | 3/1954 | Lorenz | |
| 2,748,867 A | 6/1956 | Lissant | |
| 3,075,463 A | 1/1963 | Eilers et al. | |
| 3,103,973 A | 9/1963 | Mullen | |
| 3,279,541 A | 10/1966 | Knox et al. | |
| 3,314,477 A | 4/1967 | Boevers et al. | |
| 3,336,982 A | 8/1967 | Woodward et al. | |
| 4,331,202 A | 5/1982 | Kalina | |
| 4,755,230 A | 7/1988 | Ashton et al. | |
| 5,127,955 A | 7/1992 | Fry et al. | |
| 5,183,581 A | 2/1993 | Khalil et al. | |
| 5,484,488 A | 1/1996 | Hart et al. | |
| 5,713,416 A | 2/1998 | Chatterji et al. | |
| 6,003,528 A | 12/1999 | De Souza et al. | |

(Continued)

OTHER PUBLICATIONS

"Material Safety Data Sheet", (MSDS), for Dipentene by Sigma-Aldrich Chemical Company, Sep. 20, 2012.*

(Continued)

*Primary Examiner* — John J Figueroa
*Assistant Examiner* — Atnaf Admasu
(74) *Attorney, Agent, or Firm* — Mossman Kumar & Tyler PC

(57) ABSTRACT

Generating heat within a combination solvent/acid system removes undesirable deposits from petroleum reservoir formations (especially the near well-bore region), oilfield equipment, and petroleum processing equipment. An exothermic reaction occurs between the solvent and the acid and the heat evolved helps remove organic solid deposits. The acids may include organic acid compounds, such as sulfonic acids, sulfuric acid and nitric acid. The solvents may include terpene- and terpene-derivative-containing solvents, including, but not necessarily limited to, limonene, pinene, dipentene, myrcene, turpentines and compounds having at least one double bond, such as methyl furan, dienes, styrene, vinyl acetate and the like. The exothermic reaction produces a great amount of heat, and together with using certain acids and solvents already known as effective to remove paraffin and asphaltene deposition, removing such deposits is improved.

17 Claims, 1 Drawing Sheet

(56) References Cited

U.S. PATENT DOCUMENTS

| | | |
|---|---|---|
| 6,176,243 B1 | 1/2001 | Blunk |
| 6,354,381 B1 | 3/2002 | Habeeb et al. |
| 6,681,857 B2 | 1/2004 | Habeeb et al. |
| 6,722,434 B2 | 4/2004 | Reddy et al. |
| 6,932,155 B2 | 8/2005 | Vinegar et al. |
| 7,077,199 B2 | 7/2006 | Vinegar et al. |
| 7,708,073 B2 | 5/2010 | Richard et al. |
| 2002/0055439 A1 | 5/2002 | Palmer et al. |
| 2006/0081374 A1 | 4/2006 | Bland et al. |
| 2008/0067108 A1 | 3/2008 | Sarkar et al. |
| 2009/0325823 A1 | 12/2009 | Pakulski et al. |

OTHER PUBLICATIONS

J. P. Ashton, et al., "In-Situ Heat System Stimulates Paraffinic Crude Producers in Gulf of Mexico," SPE 15660, 61st Annual Technical Conference and Exhibition, New Orleans, LA, Oct. 5-6, 1986.

* cited by examiner

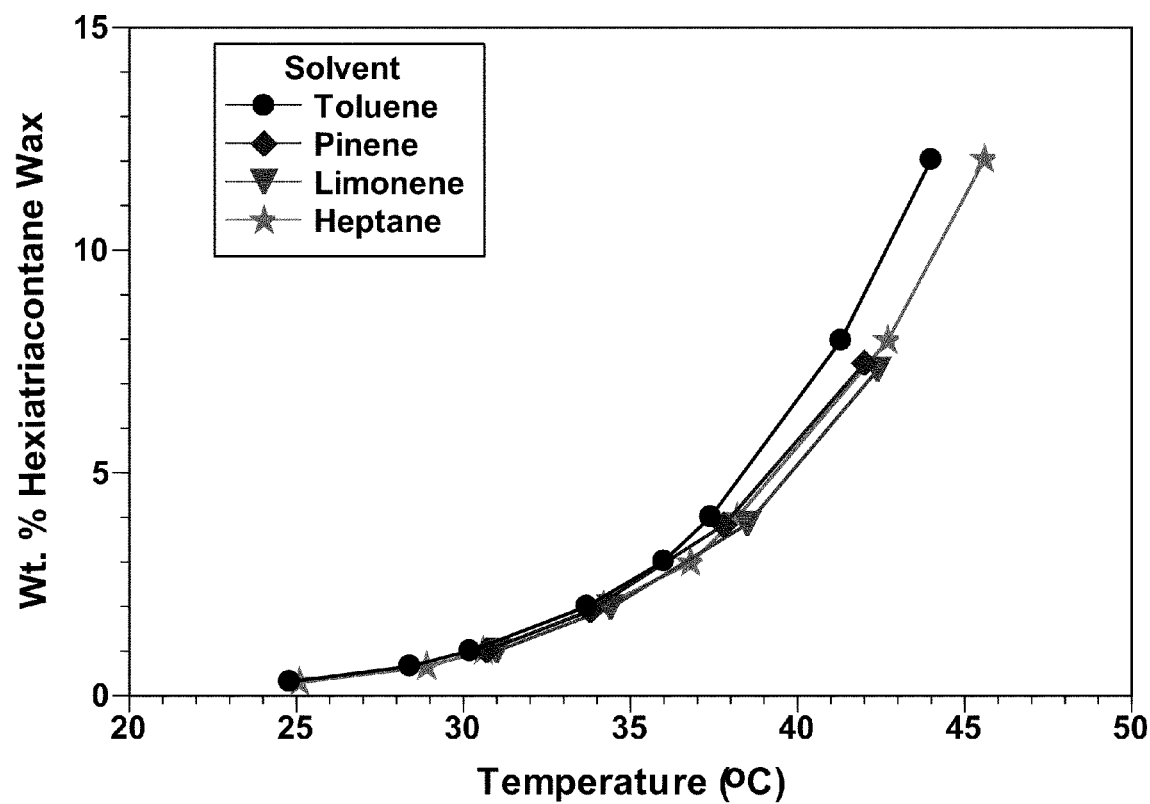

HEAT GENERATION PROCESS FOR TREATING OILFIELD DEPOSITS

CROSS-REFERENCE TO RELATED APPLICATION

This application claims the benefit of U.S. Provisional Patent Application Ser. No. 61/262,191 filed Nov. 18, 2009.

TECHNICAL FIELD

The present invention relates to methods for removing petroleum deposits in the near-wellbore reservoir formation and in petroleum production, processing, and storage equipment; and more particularly relates, in one non-limiting embodiment, to using heat and solvents and/or dispersants to remove the deposits. While the invention is suited to the treatment of paraffin and asphaltene deposits, it also has applicability for the treatment of other petroleum deposits and impediments such as tank bottoms, tar, sludge, schmoo, emulsion blocks, and hydrates.

TECHNICAL BACKGROUND

Crude oils and other heavier petroleum fractions often contain paraffinic materials. The major constituents of these paraffinic waxes contain long-chain normal alkyl regions. These waxy compounds readily crystallize out upon cooling of the oil fraction containing them. This cooling may result in deposits which obstruct the flow of hydrocarbon production fluids if the cooling occurs in a flowline such as a pipe or other conduit. These deposits must be removed from the flowlines and vessels to achieve continued and/or efficient production of petroleum. These deposits may also occur in the near-wellbore region of the formation, well production tubing, valves and chokes, flowlines, risers, surface treating vessels, and storage tanks. Tank bottoms are often a combination paraffin, asphaltene, emulsion, and/or inorganic scale.

Various methods for removing paraffin wax have been utilized in the past. Sulfur trioxide has been used to contact the paraffin and form a dispersible material that is removed with an aqueous liquid and a surfactant. Other solvents and dispersants such as a copolymer of a primary alcohol and ethylene oxide with sodium silicate and N-substituted succinimide ethers have been tried. U.S. Pat. No. 4,813,482 teaches injecting a mixture of an alkyl or aralkyl polyoxyalkylene phosphate ester surfactant in free acid form or as a salt with a mutual solvent and water to remove paraffin deposits. This mixture must be at a temperature greater than the melting point of the wax to be effective. Since none of these processes melt the wax, they can only slowly eat away at its surface. This is not fast enough at most realistic surface-to-volume ratios. Furthermore, they create dispersions in water which must be disposed of or otherwise expensively dealt with.

U.S. Pat. No. 4,755,230 teaches the use of inorganic nitrate/nitrite compounds in redox reactions which result in an exotherm which melts the paraffin deposit and generates nitrogen gas. This technique does melt the wax, but requires the use of water to deliver the reactants, so that if the wax disperses at all, which it may well not, it does so into water which then must be expensively dealt with. Furthermore, gas generating redox reactions tend to be self accelerating, rendering them at best kinetically unpredictable, and at worst explosive.

Methods for removing paraffin wax deposits from the surfaces of hydrocarbon (oil and/or gas) production equipment during oil production by melting and subsequently dispersing the deposits are also described in U.S. Pat. No. 5,484,488. These methods utilize an acid compound and a neutralizer compound which react exothermally to melt the deposit and form a dispersant to remove the melted fragments of the deposit. Examples of acids used in this method include $H_3PO_4$, $H_2SO_4$, and HCl, whereas examples of neutralizers used include NaOH, KOH, MgO, $MgCO_3$ and $NaHCO_3$.

Asphaltene deposits in hydrocarbon production equipment also cause problems and must be removed. Asphaltenes are organic materials consisting of aromatic and naphthenic ring compounds containing nitrogen, sulfur and oxygen molecules. The asphaltene fraction of crude may be defined as the organic part of the oil that is not soluble in straight-chain solvents such as pentane or heptane. Asphaltenes may exist as a colloidal suspension stabilized by resin molecules (e.g. aromatic ring systems) in the oil. The asphaltenes may precipitate as a result of a number of effects or factors including, but not necessarily limited to, pressure drop, shear forces (turbulent flow), acids, solution carbon dioxide ($CO_2$), mixing of incompatible crude oils, injected condensate, or other conditions or materials that break or disturb the stability of the asphaltic dispersion. Asphaltene deposits may also occur in the near-wellbore region of a subterranean formation, well production tubing, valves and chokes, flowlines, risers, surface treating vessels, and storage tanks.

It would thus be desirable to discover a new method and/or composition to remove paraffins, asphaltenes and other types of undesired deposits and impediments from the near-wellbore region of a subterranean formation, hydrocarbon production equipment and the like that may be easily implemented.

SUMMARY

There is provided in one non-restrictive version, a method for removing deposits that involves contacting the deposit with heat and/or a reaction product of an exothermic reaction of a solvent and an acid. The method may include contacting the deposit with the solvent and contacting the deposit with the acid, in any sequence, in which case the solvent and the acid are mixed. Alternatively, the method may include contacting the solvent with the acid to form a product by exothermic reaction, and contacting the deposit with the reaction product and heat evolved in the exothermic reaction, or any combination of these procedures. The method further involves at least partially removing the deposits by the action of a combination of heat generated by the exothermic reaction and/or one or more chemical properties of one of the components. That is, it is expected in most applications that at least one of the solvent, the acid, and/or the product will also help the method remove the deposit, such as by dissolving and/or dispersal, together with melting caused by the heat. In particular embodiments, the deposits are removed from the near-wellbore region of subterranean formations, hydrocarbon production and storage equipment, and the like. The removal may be accomplished by melting and/or increased deposit solvency with higher temperatures caused by the heat.

Suitable solvents include, but are not necessarily limited to, unsaturated compounds such as terpenes and compounds having at least one carbon-carbon double bond. Suitable acids include, but are not necessarily limited to, organic acids, inorganic acids, and combinations thereof, as will be described in more detail below.

BRIEF DESCRIPTION OF THE DRAWINGS

The FIGURE is a graph presenting the solubility of hexatriacontane wax as a function of temperature for four solvents.

DETAILED DESCRIPTION

A method for generating heat by the exothermic reaction of certain solvents with certain acid systems has been discovered for removing undesirable deposits, such as paraffins and asphaltenes from oilfield equipment. Although the method is ideally suited for treating paraffin and asphaltene deposits, it is expected that it may have applicability to other deposit removal problems in which heat generation alone would provide benefit, such as in the removal of hydrate deposits, also called clathrates. Gas hydrates are solid inclusion compounds resembling ice; they occur when water molecules form a cage-like structure around smaller "guest molecules". The most common guest molecules are methane, ethane, propane, isobutene, n-butane, nitrogen, carbon dioxide and hydrogen sulfide, of which methane occurs most abundantly in naturally-occurring hydrates. Hydrates that form in flow lines such as subsea lines subject to high temperatures and low pressures may completely block the line. More specifically, gas-cut muds may form hydrates in deepwater drilling operations, plugging blow-out preventer (BOP) lines, risers and subsea wellheads, causing well-control risks.

Deposits that may be removed by the methods herein that benefit from both the application of heat and the action of a solvent include, but are not necessarily limited to, paraffins, asphaltenes, tar, sludge, schmoo, and combinations of these. "Tar" includes, but is not necessarily limited to tar mats and tar mat materials that are present in some reservoirs and near-wellbore regions of wells which can impair production. These deposits may also occur in combinations with emulsions, inorganic scale, corrosion products, and bacteria. Schmoo is an informal "catch-all" phrase for slimy, oily substances or deposits that adhere to almost any surface it contacts, and which is difficulty removed.

Generally, suitable solvents include, but are not necessarily limited to, terpene and terpene-derivative-containing solvents, and solvents having at least one carbon-carbon double bond. Terpene-containing solvents include, but are not necessarily limited to, isoprene, monoterpenes, diterpenes, triterpenes, tetraterpenes, sesquiterpenes, sesterterpenes and combinations thereof. Specific terpene examples include limonene, pinene, dipentene (the racemic mixture of the two limonene isomers d-limonene and l-limonene), myrcene, terpinene, terpinolene, squalene, camphene, and carotene. Solvents with terpenes include mixed terpenes (e.g. turpentines, and SYLVAPINE® DP available from Arizona Chemicals) and solvents including solid terpenes (e.g. carotene) and solid terpene derivatives (e.g. retinoic acid) which may be dissolved in another solvent for reaction with an acid, and combinations thereof. Example terpene derivatives include but are not necessarily limited to terpene alcohols, terpene aldehydes, terpene acids, and partially saturated terpenes. Specific examples include retinol, retinal, retinoic acid, carvone and the like. Other non-terpene/non-terpene-derivative compounds which contain at least one carbon-carbon double bond may also be useful, including, but not necessarily limited to, vinyl compounds, dienes, indene, 2-methyl furan, octadiene, hexadiene, and combinations thereof. In one particular non-limiting embodiment useful terpenes (and derivatives thereof) and unsaturated compounds are those which are (1) readily available and inexpensive, (2) have acceptable asphaltene and wax solvent power, and (3) do not polymerize. Thus, deposits may be removed not only by heating and melting, but also by action of the solvent and/or dispersant present.

The useful acids include those dispersant chemistries which may include organic acid and inorganic acid compounds. In this context, a dispersant in general is any chemical that aids in breaking up liquids or solids as small particles or droplets into another medium. Here the dispersant helps break up the relatively solid deposits (paraffins, asphaltenes, etc.) into another medium and keeps them from re-depositing. Particularly suitable acids or dispersants include, but are not necessarily limited to, sulfonic acids, which include, but are not necessarily limited to, dodecylbenzene sulfonic acid (DDBSA), as well as inorganic acids including, but not necessarily limited to, sulfuric acid, nitric acid, and combinations thereof.

It has been discovered that the exothermic reaction produces a greater amount of heat than certain other embodiments known in the art, and by using acids and solvents already known and accepted to be applicable for treating paraffin and asphaltene deposition. In one non-limiting embodiment, the mole ratio of acid groups in the acid to double bond in the solvent ranges from about 0.01:1 to about 1:0.01 (stated another way as about 1:100 to about 100:1). Alternatively, the mole ratio of acid groups in the dispersant to double bond in the solvent ranges from about 0.03:1 to about 1:0.03 (stated another way as about 1:33 to about 33:1). In specific, but non-limiting instances, in Example 1 in the reaction of DDBSA with limonene (two double bonds) the mole ratio was about 0.18 moles $SO_3H$ per C=C, although the reaction was most likely completed after about 0.09 moles $SO_3H$ per C=C. In Example 2 in the reaction of DDBSA with limonene the mole ratio was about 0.05 moles $SO_3H$ per C=C. For Example 8, in the reaction of sulfuric acid with limonene, the mole ratio was about 1.45 moles $SO_3H$ per C=C, although the reaction was most likely completed after about 0.019 moles $H_2SO_4$ per C=C. In Example 3 in the reaction of DDBSA with myrcene (three double bonds) the mole ratio was about 0.047 moles $SO_3H$ per C=C, although the reaction was most likely completed after about 0.019 moles $SO_3H$ per C=C. In Example 4 in the reaction of DDBSA with α-pinene (one double bond) the mole ratio was about 0.31 moles $SO_3H$ per C=C. It is expected that the exothermic reactions will occur spontaneously over a wide range of temperature and pressure conditions.

In one specific, non-limiting embodiment, the method involves combining an alkyl sulfonic acid with a terpene-containing solvent to generate heat, where the solvent and the acid (a dispersant in this case) also function for dissolving (dissolution) and dispersing (dispersal) the paraffin and asphaltene deposits. Other chemical properties that may also help remove deposits in addition to or alternatively to dissolution, dispersal and heat include, but are not necessarily limited to, solvents and dispersants that affect surface tension, reduce contact angle, and improve the penetration into the deposits. The previously known art does not include using terpene-containing components for reacting with a dispersant, and particularly the acids noted above, to generate heat. An advantage of using terpene-containing solvents is that the heat generated when reacting with the alkyl sulfonic acid may be greater than other previously known techniques for generating heat by an exothermic reaction and further may be an all organic solvent/dispersant package which by itself is suitable for dissolving and dispersing paraffin and asphaltene material. In addition, disposal of an all organic treatment package and removed deposit material may potentially be accomplished with mixing them directly into sales oil.

It is interesting to note that although U.S. Pat. No. 5,484,488, noted previously, mentions that the terpene dipentene may be used as a solvent and that DDBSA and sulfuric acid may be used as the acids in their method for reacting acids with alkaline neutralizers, there is no teaching that these acids were ever combined with dipentene or that consequently that a reaction between them was ever observed.

It should be realized that there are many different ways that the solvent and the acid dispersant may be combined. One goal of the method is to deliver the heat at a remote location where the deposits are located and difficult to reach, for instance in the reservoir formation (especially in the near wellbore region), well perforations, well production tubing, at chokes or valves (e.g. surface-controlled subsurface safety valve or SCSSV), flowlines, risers, separators, pipelines, and storage tanks. These remote locations may be subsea or inland. Thus, to avoid the heat from dissipating en route, one useful embodiment is to deliver either the solvent or the acid dispersant to the site of the undesired deposit first, and then deliver the other component subsequently so that the exothermic reaction forms on contact at the deposit location. In most cases, it is expected that the exothermic reaction occurs spontaneously. In certain cases, depending on the location of the deposits, the solvent and the acid dispersant may be mixed immediately and quickly transported to a necessary nearby location. Or the solvent and acid dispersant may be mixed at the deposit site (such as through use of coiled tubing or concentric coiled tubing). A combination of these approaches may also be used.

It is envisioned that there may be a number of ways to neutralize either or both the solvent and the dispersant to prevent the exothermic reaction from occurring before the reactants are at or near the deposits. In a non-limiting instance, the solvent and/or dispersant may be chemically neutralized, which neutralization is reversed or removed once the neutralized reactant is combined at or near the deposit with the other reactant. In a different non-restrictive version, the solvent and/or dispersant may be physically prevented from reacting with each other, such as by encapsulation. The encapsulation may be removed by any common mechanism, including, but not limited to, heat, dissolution, abrasion, etc. For example, in one non-limiting embodiment, the dispersant may be encapsulated in a material that the solvent may dissolve, and then the exothermic reaction may proceed. The capsule material may also be designed to melt at reservoir temperature, for instance the temperature of the reservoir at which the deposits exist, and after the capsule melts, the reactants are free to react and generate more heat to help remove the deposit. Combinations of these and other techniques may be advantageously used to place the inhibited reactants and then liberate them to react in a multiple-stage process at the desired, pre-determined and/or pre-selected location, that in one non-limiting embodiment may gradually or even quickly generate the necessary heat to help remove the deposits.

Other components that may be included in the reaction system besides those already discussed include, but are not necessarily limited to, non-reactive solvents, non-reactive dispersants, wax inhibitors, asphaltene inhibitors, demulsifiers, defoamers, corrosion inhibitors, hydrate inhibitors, and combinations thereof. Inert solvents or carrier fluids may be used to transport the reactants and provide some deposit dissolving power, in addition to the reactive solvent, for instance xylene or water. However, if possible, in one non-restrictive embodiment, no additional inert carrier fluid should be used, or, if present, at least kept to a minimum, to minimize heat drain and waste disposal. An inert carrier fluid in this case is one which has no solvent power with respect to the deposit and is inert to an exothermic reaction with an acid present. In another non-limiting embodiment, it may be desirable to use a non-reacting solvent, in a non-restrictive example, an aromatic solvent, in addition to the solvent that is used to react with the acid. A non-reactive solvent in this case is one which has solvent power with respect to the deposit but is inert to an exothermic reaction with an acid present.

It is expected that the amount of heat generated in any particular exothermic reaction according to the methods described herein will vary according to a number of interrelated factors, including but not necessarily limited to, the particular reactants used, the relative amounts of reactants used, the conditions at which the exothermic reaction takes place (temperature, pressure, etc.), the other components in the reaction mixture that are inert to the reaction, etc. Thus, it is difficult to predict in advance and in general what the expected amount of heat generated would be. As will be seen in the Examples, temperatures as high as about 245° C. may be generated from an ambient temperature range of about 23-24° C.

The invention will now be discussed with respect to certain specific Examples demonstrating the invention which are not intended to limit it in any way but to simply illuminate it with representative data.

EXPERIMENTS WITH DDBSA AND TERPENES

Example #1

Dodecyl benzene sulfonic acid (DDBSA) was mixed into d-limonene from Florida Chemicals at room temperature: 23° C. The chemicals were mixed in a glass cylinder. The glass cylinder contained a stirring bar assembly and a thermocouple placed above the stirrer.

10.0 g d-limonene was introduced first and the DDBSA was added stepwise. A total of about 6 ml (6.05 g) was added during the course of the experiment, which lasted 6 minutes.

Result: an exotherm was generated heating the mixture to about 182° C. after the addition of 2-3 ml DDBSA. The addition of the last 2-3 ml did not seem to generate additional heat.

The reaction product was dark colored with a significant higher viscosity than limonene. The reaction product viscosity was 1349 cP at 25° C. It should be noted, dodecyl benzene sulfonic acid is a dark-colored viscous liquid and limonene is a clear-colored low viscosity liquid (about 1 cP viscosity at 25° C.).

Example #2

DDBSA was mixed into d-limonene at room temperature: 23° C. The chemicals were mixed in a glass cylinder. The glass cylinder contained a stirring bar assembly and a thermocouple placed above the stirrer.

40.01 g d-limonene was introduced first and the DDBSA was added stepwise. A total of about 7 ml (7.04 g) was added during course of the experiment, which lasted 6 minutes.

Result: an exotherm was generated heating the mixture to about 196° C. after 5 minutes, with addition of the DDBSA at about 1 ml every minute.

The reaction product was dark colored with a significant higher viscosity than limonene. The reaction product viscosity was 563 cP at 25° C.

Example #3

Dodecyl benzene sulfonic acid was mixed into myrcene at room temperature: 23° C. The chemicals were mixed in a glass cylinder. The glass cylinder contained a stirring bar assembly and a thermocouple placed above the stirrer.

20.01 g myrcene was introduced first and the DDBSA was added stepwise. A total of about 5 ml (4.79 g) was added during the course of the experiment, which lasted 6.5 minutes.

Result: an exotherm was generated heating the mixture to about 245° C. after addition of about 1 ml of DDBSA. Addition of the last 3 ml did not seem to generate additional heat.

The reaction product was a dark colored, relatively high viscosity liquid. The reaction product viscosity was not measured but was not too dissimilar to that of high viscosity myrcene.

Example #4

DDBSA was mixed into α-pinene at room temperature: 23° C. The chemicals were mixed in a glass cylinder. The glass cylinder contained a stirring bar assembly and a thermocouple placed above the stirrer.

20.05 g α-pinene was introduced first and the DDBSA was added stepwise. A total of about 10 ml (10.66 g) was added during the course of the experiment, which lasted 8.25 minutes.

Result: an exotherm was generated heating the mixture to about 81° C. after 7 min with addition of the DDBSA at about 1 ml every 45 seconds. The mixture temperature increased with each addition of DDBSA.

The reaction product was a relatively low-viscosity yellowish liquid. The reaction product viscosity was 11.9 cP at 25.0° C.

Example #5

DDBSA was mixed into β-pinene at room temperature: 23° C. The chemicals were mixed in a glass cylinder. The glass cylinder contained a stirring bar assembly and a thermocouple placed above the stirrer.

20.00 g β-pinene was introduced first. DDBSA was added stepwise. A total of about 10 ml (10.75 g) was added during course of the experiment, which lasted 8.25 minutes.

Result: an exotherm was generated heating the mixture to about 91° C. after 7 min with addition of the DDBSA at about 1 ml every 45 seconds. The mixture temperature increased with each addition of DDBSA.

The reaction product was a relatively low-viscosity yellowish liquid. The reaction product viscosity was not measured, but was similar to the reaction product with α-pinene in Example #4.

Example #6

DDBSA was mixed into SYLVAPINE® DP terpene-containing solvent from Arizona Chemicals at room temperature: 23° C. The chemicals were mixed in a glass cylinder. The glass cylinder contained a stirring bar assembly and a thermocouple placed above the stirrer.

20.03 g SYLVAPINE was introduced first. The DDBSA was added stepwise. A total of about 4 ml (4.52 g) was added during course of the experiment, which lasted 4.5 minutes.

Result: an exotherm was generated heating the mixture to about 164° C. after 2.75 min with addition of the DDBSA at about 1 ml every 45 seconds. The mixture temperature did not increase with the addition of the last 1 ml of DDBSA.

The reaction product was dark colored, with a significant higher viscosity than limonene. The reaction product viscosity was 513 cP at 25° C. SYLVAPINE is a relatively low-viscosity yellowish liquid.

Example #7

DDBSA was mixed into Crown Turpentine solvent available from Packaging Service Co, Inc. at room temperature: 23° C. The chemicals were mixed in a glass cylinder. The glass cylinder contained a stirring bar assembly and a thermocouple placed above the stirrer.

20.01 g turpentine was introduced first. The DDBSA was added stepwise. A total of about 10 ml was added during the course of the experiment, which lasted 7 minutes.

Result: an exotherm was generated heating the mixture to about 72° C. after 6 min with addition of the DDBSA at about 1.5 ml every minute.

The reaction product was dark colored with a moderately higher viscosity than the turpentine. The reaction product viscosity was 49.2 cP at 25.0° C.

EXPERIMENT WITH CONCENTRATED SULFURIC ACID AND A TERPENE

Example #8

Concentrated sulfuric acid was mixed into d-limonene from Florida Chemicals at room temperature: 22° C. The chemicals were mixed in a glass cylinder. The glass cylinder contained a stirring bar assembly and a thermo-couple placed above the stirrer.

20.02 g d-limonene was introduced first. The sulfuric acid was added stepwise. A total of about 4 ml was added during course of the experiment, which lasted 8.5 minutes.

Result: an exotherm was generated heating the mixture to about 136° C. after the addition of 1 ml concentrated sulfuric acid at about 1.75 min. Addition of the remaining sulfuric acid did not seem to generate additional heat.

The reaction product was dark colored with a significant higher viscosity than limonene. The reaction product viscosity was 174 cP at 25° C. It should be noted that, unlike dodecyl benzene sulfonic acid, sulfuric acid is a low-viscosity clear liquid.

EXPERIMENTS WITH DDBSA AND OTHER DOUBLE BOND COMPOUNDS IN LINEAR DI-ALKENES

Example #9

DDBSA was mixed into 1,7-octadiene at room temperature: 23° C. The chemicals were mixed in a glass cylinder. The glass cylinder contained a stirring bar assembly and a thermocouple placed above the stirrer.

20.06 g 1,7-octadiene was introduced first. The DDBSA was added stepwise. A total of about 10 ml (10.24 g) was added during course of the experiment, which lasted 6 minutes.

Result: a small exotherm was generated heating the mixture to about 32° C. after all the DDBSA was added at about 4 min. DDBSA was added at about 1 ml/minute up to 4 minutes. Then 5 ml additional DDBSA was added. The mixture temperature increased with each addition of DDBSA.

The reaction product was a dark colored relatively low viscosity fluid.

Example #10

DDBSA was mixed into 1,5-hexadiene at room temperature. The chemicals were mixed in a glass cylinder. The glass cylinder contained a stirring bar assembly and a thermocouple placed above the stirrer.

25.02 g 1,5-hexadiene was introduced first. The DDBSA was added stepwise. A total of about 10 ml (10.52 g) was added during course of the experiment, which lasted 10 minutes.

Only a very small exotherm was generated heating the mixture to about 25.5° C. after all the DDBSA was added at about 10 min. DDBSA was added at about 1 ml every 45 seconds.

The reaction product was a dark colored relatively low viscosity fluid.

IN METHYL FURAN

Example #11

DDBSA was mixed into 2 methyl furan at room temperature: 23° C. The chemicals were mixed in a glass cylinder. The glass cylinder contained a stirring bar assembly and a thermocouple placed above the stirrer.

20.02 g 2-methylfuran was introduced first. The DDBSA was added stepwise. A total of about 3 ml (3.04 g) was added during course of the experiment, which lasted 6.5 minutes.

Result: an exotherm was generated heating the mixture to about 126° C. after the DDBSA was added. The reaction product was a dark solid glassy-type polymer material.

IN INDENE

Example #12

DDBSA was mixed into indene at room temperature: 23° C. The chemicals were mixed in a glass cylinder. The glass cylinder contained a stirring bar assembly and a thermocouple placed above the stirrer.

20.05 g indene was introduced first. The DDBSA was added stepwise. A total of about 3 ml (2.67 g) was added during course of the experiment, which lasted 4 minutes.

The result was the immediate formation of solids (likely polymerization) with an exotherm which generated heat, heating the mixture to about 144° C. after the DDBSA was added. As the temperature increased the solid presumably melted and a liquid was present. As the reaction product cooled, a dark glassy-type polymer solid was formed.

IN STYRENE

Example #13

DDBSA was mixed into styrene at room temperature: 23° C. The chemicals were mixed in a glass cylinder. The glass cylinder contained a stirring bar assembly and a thermocouple placed above the stirrer.

20.02 g styrene was introduced first. DDBSA was added stepwise. A total of about 4 ml (4.58 g) was added during course of experiment, which lasted 4.5 minutes.

The result was an exotherm that heated the mixture to about 194° C. after about 2 ml of the DDBSA was added. Addition of an extra 2 ml DDBSA did not generate extra heat. The reaction product initially appeared to be a dark resin glassy-type polymer material at room temperature. It later separated into two phases with a dark solid top phase. Initially at higher temperatures it was liquid.

IN VINYL ACETATE

Example #14

DDBSA was mixed into vinyl acetate at room temperature: 23° C. The chemicals were mixed in a glass cylinder. The glass cylinder contained a stirring bar assembly and a thermocouple placed above the stirrer.

20.01 g vinyl acetate was introduced first. DDBSA was added step-wise. A total of about 11 ml (11.02 g) was added during course of experiment, which lasted 12.5 minutes.

The result was that a small exotherm was generated, heating the mixture to about 37° C. after about 11 ml of the DDBSA was added. The reaction product was a dark colored relatively low viscosity fluid.

EXPERIMENTS WITH OTHER ACIDS NOT GENERATING HEAT

Example #15

Glacial acetic acid was mixed into d-limonene at room temperature: 23° C. The chemicals were mixed in a glass cylinder. The glass cylinder contained a stirring bar assembly and a thermocouple placed above the stirrer.

20.08 g d-limonene was introduced first. The acetic acid was added stepwise. A total of about 10 ml (10.37 g) was added during course of the experiment, which lasted about 6 minutes.

No exotherm or apparent reaction was observed.

Example #16

Hydrochloric acid (about 37%) was mixed into d-limonene at room temperature: 23° C. The chemicals were mixed in a glass cylinder. The glass cylinder contained a stirring bar assembly and a thermocouple placed above the stirrer.

20.08 g d-limonene was introduced first. The HCl was added stepwise. A total of about 10 ml was added during the course of the experiment, which lasted about 6 minutes.

No exotherm or apparent reaction was observed.

Example #17

70% phosphorous acid was mixed into d-limonene at room temperature: 24° C. The chemicals were mixed in a glass cylinder. The glass cylinder contained a stirring bar assembly and a thermocouple placed above the stirrer.

20.00 g d-limonene was introduced first. The phosphorous acid was added stepwise. A total of about 10 ml was added during course of the experiment, which lasted about 5 minutes.

No exotherm or apparent reaction was observed.

Example #18

Methane sulfonic acid was mixed into d-Limonene solvent from Florida Chemicals at room temperature: 22° C. The chemicals were mixed in a glass cylinder. The glass cylinder contained a stirring bar assembly and a thermo-couple placed above the stirrer.

20.00 g of d-limonene was used. Methane sulfonic acid was added stepwise. A total of about 6 ml (8.50 g) of methane sulfonic acid was added during first six minutes. The experiment was stopped after 8 minutes.

The methane sulfonic acid appeared to be totally immiscible. Two liquid phases occurred on mixing methane sulfonic acid in the limonene. No exotherm or apparent reaction observed. A minor temperature increase to 24° C. is believed to be from mixing.

Example #19 p-Toluene sulfonic acid was mixed into d-Limonene solvent from Florida Chemicals at room temperature: 22° C. The chemicals were mixed in a glass cylinder. The glass cylinder contained a stirring bar assembly and a thermocouple placed above the stirrer.

20.09 g of d-limonene was used. Solid p-Toluene sulfonic acid was added stepwise. A total of 5.99 g was added over four minutes. The solid p-toluene sulfonic acid appeared insoluble. The experiment was stopped after 10 minutes. No exotherm or apparent reaction was observed. A minor temperature increase to 23.0° C. was believed to be from the mixing.

Example #20

Sulfamic acid was mixed into d-Limonene solvent from Florida Chemicals at room temperature: 23° C. The chemicals were mixed in a glass cylinder. The glass cylinder contained a stirring bar assembly and a thermo-couple placed above the stirrer.

20.01 g d-limonene was used. Solid sulfamic acid was added step-wise. A total of 6.05 g was added over five minutes. The solid sulfamic acid appeared insoluble. The experiment was stopped after nine minutes. No exotherm or apparent reaction observed.

EXPERIMENTS WITH NITRIC ACID GENERATING A SMALL AMOUNT OF HEAT

Example #21

Nitric acid was mixed into d-limonene at room temperature: 23° C. The chemicals were mixed in a glass cylinder. The glass cylinder contained a stirring bar assembly and a thermocouple placed above the stirrer.

20.00 g d-limonene was introduced first. The nitric acid was added stepwise. A total of about 7 ml was added during course of the experiment, which lasted about 12 minutes.

Result: an exotherm was generated heating the mixture to about 38° C. after 9 minutes with addition of the nitric acid. The nitric acid was added at about 1 ml every 45 seconds up to 3.75 minutes at which time the final 3 ml added.

The reaction product was a two phase liquid mixture with a dark upper phase that was moderately viscous.

Table I summarizes Examples 1-21 presented in more detail above. It should be noted that the maximum temperatures generated in the experiments were influenced by the boiling points of the reactants which in several cases were below the maximum temperatures which were generated.

TABLE I

Heat Generation Examples with Solvents and Dispersants

| Ex. | Reaction Initiator (Dispersant) | Reactive Solvent | Max Temp (° C.) | Comment |
|---|---|---|---|---|
| | Significant Heat Generation | | | |
| | Terpenes | | | |
| 1 | DDBSA | d-Limonene | 182 | |
| 2 | " | d-Limonene | 196 | |
| 3 | " | Myrcene | 245 | |
| 4 | " | α-Pinene | 81 | |
| 5 | " | β-Pinene | 91 | |
| 6 | " | SYLVAPINE ® Solvent | 164 | |
| 7 | | Crown turpentine | 72 | |
| 8 | Concentrated Sulfuric Acid | d-Limonene | 136 | |
| | Other Double Bond Structures | | | |
| 11 | DDBSA | 2 Methyl Furan | 126 | Solid polymerization |
| 12 | " | Indene | 144 | Solid polymerization |
| 13 | | Styrene | 194 | Polymerization to solid/resin |
| 14 | | Vinyl acetate | 37 | No polymerization |
| | Slight Heat Generation | | | |
| 9 | DDBSA | 1,7 Octadiene | 32 | |
| 10 | " | 1,5 Hexadiene | 25 | Started at 20° C. |
| 21 | Nitric Acid | d-Limonene | 38 | |
| | No Heat Generation | | | |
| 15 | Glacial Acetic acid | d-Limonene | 23* | |
| 16 | HCl | | 25 | |
| 17 | 70% Phosphorous Acid | | 24* | |
| 18 | Methane Sulfonic Acid | | 24 | |
| 19 | Sulfamic Acid | | 23* | |
| 20 | p-Toluene Sulfonic Acid | | 23 | |

*Starting temperatures

Examples 11-13 which produced a solid—likely a polymer—are not examples of the method herein since an important goal of the method is to remove solids, not introduce them. Indeed, the method herein for generating heat using the terpene-containing solvent and the acid dispersant was later used to heat and remove these solids from the glass cylinders.

EXPERIMENTS TO EXAMINE THE EFFECT OF NON-REACTIVE SOLVENT ADDITION

A series of experiments were performed to evaluate the effect of addition of an extra solvent which is relatively inert towards the reaction but could provide potential benefit in the properties of the final reaction product. For example, the solvent power or physical properties (such as viscosity) of the final reaction product could be altered. On the other hand the heat generation of the process would be expected to be reduced as the reactive solvent amount is decreased.

Example #21

Base Comparison Test

No Non-Reactive Solvent Addition

Dodecyl benzene sulfonic acid (DDBSA) was mixed into d-limonene from Florida Chemicals at room temperature: 23°

C. The chemicals were mixed in a glass cylinder. The glass cylinder contained a stirring bar assembly and a thermocouple placed above the stirrer.

20.06 g d-limonene was introduced first. The DDBSA was added at the beginning of the experiment. A total of about 4 ml (4.16 g) was added.

The result was that an exotherm generated heating the mixture to about 186° C. within 30 seconds after dodecyl benzene sulfonic acid addition. The result was similar to that of Examples #1 and 2. The reaction product was a dark colored mixture with a significantly higher viscosity than limonene. The viscosity was 317 cP at 25° C.

Example #23

Dodecyl benzene sulfonic acid (DDBSA) was mixed into a mixture of d-limonene from Florida Chemicals and Aromatic 150, a heavy aromatic naphtha available from ExxonMobil at room temperature: 25° C. The mixture was approximately 75% limonene and 25% Aromatic 150. The chemicals were mixed in a glass cylinder. The glass cylinder contained a stirring bar assembly and a thermocouple was placed above the stirrer.

The 15.00 g d-limonene and 5.01 g Aromatic 150 were introduced first. DDBSA was added at the beginning of the experiment. A total of ~3 ml (3.36 g) was added.

The result was that an exotherm was generated heating the mixture to about 150° C. within 30-60 seconds after the DDBSA addition. The reaction product was a dark colored mixture with a higher viscosity than limonene. The viscosity was significantly less than the reaction product of Example #22. The viscosity was 29.5 cP at 25° C.

Example #24

DDBSA was mixed into a mixture of d-limonene from Florida Chemicals and Aromatic 150, a heavy aromatic naphtha from ExxonMobil, at room temperature: 24° C. The mixture was approximately 50% limonene and 50% Aromatic 150. The chemicals were mixed in a glass cylinder. The glass cylinder contained a stirring bar assembly and a thermocouple placed above the stirrer.

The 10.04 g d-limonene and 10.00 g Aromatic 150 were introduced first. The DDBSA was added at the beginning of the experiment. A total of about 2 ml (2.23 g) was added.

The result was that an exotherm was generated heating the mixture to about 92° C. in approximately 3 minutes after the DDBSA addition. The reaction product was a dark colored mixture. The viscosity was significantly less than the reaction product of Example #22. The viscosity was 7.5 cP at 25° C.

Example #25

DDBSA was mixed into a mixture of d-limonene from Florida Chemicals and Aromatic 150 a heavy aromatic naphtha from ExxonMobil at room temperature: 25° C. The mixture was approximately 50% limonene and 50% Aromatic 150. The chemicals were mixed in a glass cylinder. The glass cylinder contained a stirring bar assembly and a thermocouple placed above the stirrer.

10.04 g d-limonene and 10.00 g Aromatic 150 were introduced first. DDBSA was added at the beginning of the experiment. A total of ~3 ml (3.28 g) was added.

The result was that an exotherm was generated heating the mixture to about 106° C. in approximately 30 seconds after the DDBSA addition. The reaction product was a dark colored mixture. The viscosity was significantly less than the reaction product of Example #22. The viscosity was 8.9 cP at 25° C.

Example #26

DDBSA was mixed into a mixture of d-limonene from Florida Chemicals and xylene at room temperature: 23° C. The mixture was approximately 50% limonene and 50% xylene. The chemicals were mixed in a glass cylinder. The glass cylinder contained a stirring bar assembly and a thermocouple placed above the stirrer.

10.03 g d-limonene and 10.01 g xylene were introduced first. DDBSA was added at the beginning of the experiment. A total of about 4 ml was added.

The result was that an exotherm was generated heating the mixture to about 101° C. in approximately one minute after the DDBSA addition. The reaction product was a dark colored mixture. The viscosity was significantly less than the reaction product of Example #22. The viscosity was 8.9 cP at 25° C.

Example #27

DDBSA was mixed into a mixture of d-limonene from Florida Chemicals and hexadecane at room temperature: 23° C. The mixture was approximately 50% limonene and 50% hexadecane. The chemicals were mixed in a glass cylinder. The glass cylinder contained a stirring bar assembly and a thermocouple placed above the stirrer.

10.02 g d-limonene and 10.02 g hexadecane were introduced first. DDBSA was added at the beginning of the experiment. A total of about 2 ml (2.00 g) was added.

The result was that an exotherm was generated heating the mixture to about 87° C. in approximately 2.5 minute after DDBSA addition. The reaction product was a dark colored mixture. The viscosity was not measured but was significantly less than the reaction product of Example #22. The viscosity was similar to that in Examples 24-26.

Table II below is a summary of Examples 22-27.

TABLE II

Heat Generation Examples with Solvents and Dispersants

| Ex. | Reaction Initiator | Reactive Solvent | Inert Solvent | Max Temp (° C.) | Reaction Product Viscosity (cP) at 25° C. |
|---|---|---|---|---|---|
| 22 | 4.16 g DDBSA | 20.06 g Limonene | — | 186 | 317 |
| 23 | 3.36 g DDBSA | 15.00 g Limonene | 5.01 g Aromatic 150 | 150 | 29.5 |
| 24 | 2.23 g DDBSA | 10.04 g Limonene | 10.00 g Aromatic 150 | 92 | 7.5 |
| 25 | 3.28 g DDBSA | 10.04 g Limonene | 10.00 g Aromatic 150 | 106 | 8.9 |

TABLE II-continued

Heat Generation Examples with Solvents and Dispersants

| Ex. | Reaction Initiator | Reactive Solvent | Inert Solvent | Max Temp (° C.) | Reaction Product Viscosity (cP) at 25° C. |
|---|---|---|---|---|---|
| 26 | 4 ml DDBSA | 10.03 g Limonene | 10.01 g Xylene | 101 | 5.2 |
| 27 | 2.00 g DDBSA | 10.02 g Limonene | 10.02 g Hexadecane | 87 | Not measured |

EXPERIMENTS TO EXAMINE THE EFFECT OF MIXED REACTIVE SOLVENT ADDITION

A series of experiments were performed to evaluate the effect of mixing two reactive solvents. One of the solvents was limonene and the other was either α-pinene or turpentine. It was discovered that alone limonene gives a greater exothermic heat generation than pinene or turpentine. The reaction product of limonene is more viscous, though. As shown in Examples 22-27, adding an inert solvent will reduce the final product viscosity but the amount of heat generation is reduced. The experiments in the following examples were performed to determine the effect of using a second reactive solvent (which alone does not produce a relatively viscous final reaction product) with limonene.

Example #28

DDBSA was mixed into a mixture of d-limonene from Florida Chemicals and Crown turpentine from Packaging Services Company at room temperature: 24° C. The mixture was approximately 50% limonene and 50% turpentine. The chemicals were mixed in a glass cylinder. The glass cylinder contained a stirring bar assembly and a thermocouple placed above the stirrer.

10.01 g d-limonene and 10.02 g turpentine were introduced first. DDBSA was added at the beginning of the experiment, and about 2 ml (2.106 g) was added.

The result was an exotherm generated that heated the mixture to about 43° C. within two minutes of the DDBSA addition. The amount of heat generated was less than that in Examples #24 and #27 despite using reactive turpentine instead of inert solvents. The reaction product was a dark colored mixture. The viscosity was not measured, but was significantly less than the reaction product of Example #22.

Example #29

DDBSA was mixed into a mixture of d-limonene from Florida Chemicals and α-pinene from Aldrich Chemicals at room temperature: 24° C. The mixture was approximately 50% limonene and 50% pinene. The chemicals were mixed in a glass cylinder. The glass cylinder contained a stirring bar assembly and a thermocouple placed above the stirrer.

10.02 g d-limonene and 10.01 g α pinene were introduced first. DDBSA was added at the beginning of the experiment; a total of about 2 ml (2.308 g) was added.

The result was an exotherm generated which heated the mixture to about 49° C. within one minute of the DDBSA addition. The amount of heat generated was less than Examples #24 and #27 despite using reactive pinene instead of inert solvents. The reaction product was a dark colored mixture. The viscosity was not measured, but it was significantly less than the reaction product of Example #22.

Example #30

DDBSA was mixed into a mixture of d-limonene from Florida Chemicals and α-pinene from Aldrich Chemicals at room temperature: 25° C. The mixture was approximately 50% limonene and 50% pinene. The chemicals were mixed in a glass cylinder. The glass cylinder contained a stirring bar assembly and a thermocouple placed above the stirrer.

10.01 g d-limonene and 10.01 g α pinene were introduced first. The DDBSA was added in two steps. About 4 ml was added at the beginning of experiment and another approximately 2 ml was added after 45 seconds. A total of 5.894 g was added.

The result was that an exotherm was generated which heated the mixture to about 66° C. in approximately 45 seconds and then to about 81° C. after one minute with the second DDBSA addition. The reaction product was a dark colored mixture. The viscosity was significantly less than the reaction product of Example #22. The viscosity was 3.7 cP at 25° C.

Table III below is a summary of Examples 28-30.

TABLE III

Heat Generation Examples with Solvents and Dispersants

| Ex | Reaction Initiator | Reactive Solvent # 1 | Reactive Solvent # 2 | Max Temp (° C.) | Reaction Product Viscosity (cP) at 25° C. |
|---|---|---|---|---|---|
| 28 | 2.11 g DDBSA | 10.01 g Limonene | 10.02 g Crown Turpentine | 43 | Not measured |
| 29 | 2.31 g DDBSA | 10.02 g Limonene | 10.01 g Alpha pinene | 49 | Not measured |
| 30 | 5.89 g DDBSA | 10.01 g Limonene | 10.01 g Alpha pinene | 81 | 3.7 |

EXPERIMENT TO EXAMINE IF REACTION WILL START AT 4° C.

Example #31

Procedure: 40.33 g limonene was added to a 600 ml jacketed beaker equipped with a magnetic stirring bar/stirrer. The limonene was cooled to 4.3° C. A thermocouple was placed into the limonene to monitor temperature. Chilled DDBSA (about 6° C.) was injected into the limonene and temperature monitored over time. The circulating bath was turned off shortly after injection of the DDBSA. The DDBSA was added stepwise. Below is the temperature profile of the experiment.

| Time (min:sec) | Temp (° C.) | Comment |
|---|---|---|
| 0:00 | 4.3 | Injected ~2 ml DDBSA |
| 0:30 | 9.0 | Injected ~2 ml DDBSA |
| 0:45 | 12.3 | |
| 1:00 | 11.6 | Injected ~2 ml DDBSA |
| 1:20 | 15.2 | |
| 1:40 | 17.4 | Injected ~2 ml DDBSA |
| 2:15 | 23.1 | Injected ~2 ml DDBSA |
| 2:30 | 42.6 | (9.92 g DDBSA total added) |
| 2:38 | 195.8 | |
| 3:00 | 160.7 | |
| 4:00 | 93.1 | |

Table IV presents the solubility measurements of asphaltenes in limonene and toluene. The FIGURE is a graph presenting the solubility of hexatriacontane wax as a function of temperature for four solvents. Table IV and the FIGURE presents the useful of the solvents for the methods herein.

TABLE IV

| | Asphaltene Solubility (Weight %) | |
|---|---|---|
| Solvent | 21° C. | 50° C. |
| Limonene | ~22 | ≥30 |
| Toluene | ≥30 | ≥35 |

In the foregoing specification, the invention has been described with reference to specific embodiments thereof, and has been demonstrated as effective in providing methods and compositions for delivering and generating heat, as well as solvents and dispersants, at remote locations, such as in wellbores drilled into subterranean reservoirs, in subterranean formations themselves (particularly the near wellbore part of the formation), downhole equipment, tubing, chokes, valves, separators, tanks, pipelines, and the like to remove deposits therefrom. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of solvents, acids, dispersants and other components falling within the claimed parameters, but not specifically identified or tried in a particular method or composition, are anticipated to be within the scope of this invention. Furthermore, reaction conditions other than those specifically exemplified herein are expected to be useful for the methods and compositions described herein.

The words "comprising" and "comprises" as used throughout the claims is interpreted "including but not limited to".

The present invention may suitably comprise, consist or consist essentially of the elements disclosed and may be practiced in the absence of an element not disclosed. For instance, in a non-limiting instance, the method for removing deposits consists of or consists essentially of contacting the deposit with one or more solvents and one or more acids in any order, where the solvents and acids are as set out in the claims.

What is claimed is:

1. A method for removing deposits from a subterranean formation, hydrocarbon production equipment and/or oilfield processing equipment consists essentially of:
contacting the deposit with heat from an exothermic reaction of at least one solvent and at least one acid by a procedure selected from the group consisting of:
(a) in any sequence:
contacting the deposit with the at least one solvent, contacting the deposit with the at least one acid; and mixing and reacting the at least one solvent and the at least one acid; and
(b) contacting and reacting the at least one solvent with the at least one acid; and
(c) a combination of (a) and (b);
forming at least one product by exothermic reaction, and contacting the deposit with heat evolved in the exothermic reaction and/or the at least one product from the exothermic reaction; and
at least partially removing the deposits by heat generated by the exothermic reaction;
where the at least one solvent comprises an unsaturated compound selected from the group consisting of terpenes, terpene-derivatives, compounds having at least one carbon-carbon double bond, and combinations thereof; and
where the at least one acid comprises an acid selected from the group consisting of an organic acid, an inorganic acid, and combinations thereof.

2. The method of claim 1 further comprising at least partially removing the deposits additionally by at least one chemical property of a component selected from the group consisting of the at least one solvent, the at least one acid, the at least one product and combinations thereof.

3. The method of claim 1 where the deposits are selected from the group consisting of paraffins, asphaltenes, tar, hydrates, sludge, schmoo, and combinations of these.

4. The method of claim 1 where:
the at least one solvent is selected from the group consisting of limonene, pinene, dipentene, myrcene, isoprenes, monoterpenes, diterpenes, triterpenes, tetraterpenes, sesquiterpenes, sesterterpenes, terpinene, terpinoline, squalene, camphene, carotene, carvone, retinol, terpene derivatives, terpenoids, mixed terpenes, solid terpenes, indene, 2-methyl furan, octadiene, hexadiene, styrene, vinyl acetate, retene, retinal, retinoic acid, vinyl compounds and combinations thereof; and
the at least one acid is selected from the group consisting of sulfonic acids, sulfuric acid, nitric acid, and combinations thereof.

5. The method of claim 1 where the mole ratio of acid group in the at least one acid to double bond in the at least one solvent ranges from about 1:100 to about 100:1.

6. The method of claim 1 where the mole ratio of acid group in the at least one acid to double bond in the at least one solvent ranges from about 1:33 to about 33:1.

7. The method of claim 1 where the deposits reside at a location selected from the group consisting of:
reservoir formation,
hydrocarbon production equipment,
downhole equipment,
tubing,
chokes,
valves,
separators,
pipelines,
tanks,
wellbore walls
petroleum processing equipment, and
combinations thereof.

8. A method for removing deposits from a subterranean formation, hydrocarbon production equipment and/or oilfield processing equipment consists essentially of:
  contacting the deposit with heat from an exothermic reaction of at least one solvent and at least one acid by a procedure selected from the group consisting of:
    (a) in any sequence:
      contacting the deposit with the at least one solvent,
      contacting the deposit with the at least one acid; and
      mixing and reacting the at least one solvent and the at least one acid; and
    (b) contacting and reacting the at least one solvent with the at least one acid; and
    (c) a combination of (a) and (b);
  forming at least one product by exothermic reaction, and contacting the deposit with heat evolved in the exothermic reaction and/or the at least one product from the exothermic reaction; and
  at least partially removing the deposits by heat generated by the exothermic reaction;
  where the at least one solvent comprises an unsaturated compound selected from the group consisting of terpenes, terpene-derivatives, compounds having at least one carbon-carbon double bond, and combinations thereof;
  where the at least one acid comprises an acid selected from the group consisting of sulfonic acids, sulfuric acid, nitric acid, and combinations thereof; and
  where the mole ratio of acid group in the at least one acid to double bond in the at least one solvent ranges from about 1:100 to about 100:1.

9. The method of claim 8 further comprising at least partially removing the deposits additionally by at least one chemical property of a component selected from the group consisting of the at least one solvent, the at least one acid, the at least one product and combinations thereof.

10. The method of claim 8 where the deposits are selected from the group consisting of paraffins, asphaltenes, tar, hydrates, sludge, schmoo, and combinations of these.

11. The method of claim 8 where:
  the at least one solvent is selected from the group consisting of limonene, pinene, dipentene, myrcene, isoprenes, monoterpenes, diterpenes, triterpenes, tetraterpenes, sesquiterpenes, sesterterpenes, terpinene, terpinoline, squalene, camphene, carotene, carvone, retinol, terpene derivatives, terpenoids, mixed terpenes, solid terpenes, indene, 2-methyl furan, octadiene, hexadiene, styrene, vinyl acetate, retene, retinal, retinoic acid, vinyl compounds and combinations thereof.

12. The method of claim 8 where the deposits reside at a location selected from the group consisting of:
  reservoir formation,
  hydrocarbon production equipment,
  downhole equipment,
  tubing,
  chokes,
  valves,
  separators,
  pipelines,
  tanks,
  wellbore walls
  petroleum processing equipment, and
  combinations thereof.

13. The method of claim 8 where the mole ratio of acid group in the at least one acid to double bond in the at least one solvent ranges from about 1:33 to about 33:1.

14. A method for removing deposits from a subterranean formation, hydrocarbon production equipment and/or oilfield processing equipment consists essentially of:
  contacting the deposit with heat from an exothermic reaction of at least one solvent and at least one acid by a procedure selected from the group consisting of:
    (a) in any sequence:
      contacting the deposit with the at least one solvent,
      contacting the deposit with the at least one acid; and
      mixing and reacting the at least one solvent and the at least one acid; and
    (b) contacting and reacting the at least one solvent with the at least one acid; and
    (c) a combination of (a) and (b);
  forming at least one product by exothermic reaction, and contacting the deposit with heat evolved in the exothermic reaction and/or the at least one product from the exothermic reaction; and
  at least partially removing the deposits by a combination of heat generated by the exothermic reaction and at least one chemical property of a component selected from the group consisting of the at least one solvent, the at least one acid, the at least one product and combinations thereof;
  where the at least one solvent is selected from the group consisting of limonene, pinene, dipentene, myrcene, isoprenes, monoterpenes, diterpenes, triterpenes, tetraterpenes, sesquiterpenes, sesterterpenes, terpinene, terpinoline, squalene, camphene, carotene, carvone, retinol, terpene derivatives, terpenoids, mixed terpenes, solid terpenes, indene, 2-methyl furan, octadiene, hexadiene, styrene, vinyl acetate, retene, retinal, retinoic acid, vinyl compounds and combinations thereof;
  where the at least one acid is selected from the group consisting of sulfonic acids, sulfuric acid, nitric acid, and combinations thereof; and
  where the mole ratio of acid group in the at least one acid to double bond in the at least one solvent ranges from about 1:100 to about 100:1.

15. The method of claim 14 where the deposits are selected from the group consisting of paraffins, asphaltenes, tar, hydrates, sludge, schmoo, and combinations of these.

16. The method of claim 14 where the deposits reside at a location selected from the group consisting of:
  reservoir formation,
  hydrocarbon production equipment,
  downhole equipment,
  tubing,
  chokes,
  valves,
  separators,
  pipelines,
  tanks,
  wellbore walls,
  petroleum processing equipment, and
  combinations thereof.

17. The method of claim 14 where the mole ratio of acid group in the at least one acid to double bond in the at least one solvent ranges from about 1:33 to about 33:1.

* * * * *